United States Patent
Arcese

(10) Patent No.: US 8,370,824 B2
(45) Date of Patent: Feb. 5, 2013

(54) DYNAMIC CLASS LOADING

(75) Inventor: Mauro Arcese, Fontana Liri (IT)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 12/181,449

(22) Filed: Jul. 29, 2008

(65) Prior Publication Data

US 2009/0106747 A1   Apr. 23, 2009

(30) Foreign Application Priority Data

Oct. 23, 2007 (FR) .................................. 07 119132

(51) Int. Cl.
*G06F 9/44* (2006.01)
*G06F 9/45* (2006.01)

(52) U.S. Cl. ........ 717/166; 717/108; 717/151; 717/162; 717/165

(58) Field of Classification Search .................. None
See application file for complete search history.

(56) References Cited

U.S. PATENT DOCUMENTS

| | | | |
|---|---|---|---|
| 5,727,147 A | 3/1998 | van Hoff | |
| 6,748,396 B2 | 6/2004 | Klicnik et al. | |
| 6,851,111 B2 | 2/2005 | McGuire et al. | |
| 6,865,730 B1 * | 3/2005 | Burke et al. | 717/116 |
| 6,985,950 B1 | 1/2006 | Hanson et al. | |
| 2002/0046304 A1 * | 4/2002 | Fabri et al. | 709/331 |
| 2002/0069399 A1 * | 6/2002 | Miloushey et al. | 717/108 |
| 2002/0069400 A1 * | 6/2002 | Miloushev et al. | 717/108 |
| 2002/0120924 A1 * | 8/2002 | Miloushev et al. | 717/165 |
| 2002/0184226 A1 * | 12/2002 | Klicnik et al. | 707/100 |
| 2003/0056205 A1 * | 3/2003 | Miloushev et al. | 717/162 |
| 2003/0121031 A1 * | 6/2003 | Fraenkel et al. | 717/166 |
| 2003/0135850 A1 * | 7/2003 | Miloushev et al. | 717/165 |
| 2004/0019596 A1 * | 1/2004 | Taylor et al. | 707/100 |
| 2004/0143826 A1 * | 7/2004 | Gissel et al. | 717/162 |
| 2005/0060698 A1 * | 3/2005 | Boykin et al. | 717/166 |
| 2005/0216885 A1 * | 9/2005 | Ireland | 717/108 |
| 2006/0059156 A1 * | 3/2006 | Janes et al. | 707/9 |
| 2007/0006203 A1 | 1/2007 | Marwinski | |
| 2007/0061792 A1 * | 3/2007 | Atsatt | 717/151 |
| 2007/0061795 A1 * | 3/2007 | Atsatt | 717/166 |
| 2007/0245331 A1 * | 10/2007 | Daynes et al. | 717/166 |

OTHER PUBLICATIONS

Sybase et al., System Administration Guide, EAServer 6.0, Jul. 2006 [Retrieved on Mar. 9, 2012]. Retrieved from the internet: <URL:http://infocenter.sybase.com/help/topic/com.sybase.infocenter.dc38034.0600/pdf/eassag.pdf> pp. 1-240 (Total of 258 pages).*

(Continued)

*Primary Examiner* — Don Wong
*Assistant Examiner* — Anibal Rivera
(74) *Attorney, Agent, or Firm* — Brevetto Law Group

(57) ABSTRACT

According to one embodiment of the present invention a method is disclosed. The method includes requesting a class to be dynamically loaded during program execution. The class includes an attribute. A properties file is searched for the attribute. An associated delegation policy is found in the properties file. The associated delegation policy is associated with the attribute. The class is loaded by applying the associated delegation policy.

19 Claims, 4 Drawing Sheets

OTHER PUBLICATIONS

Li Gong, Secure Java Class Loading, 1998 IEEE Internet Computing, [Retrieved on Sep. 23, 2012]. Retrieved from the internet: <URL:http://ieeexplore.ieee.org/stamp/stamp.jsp?tp=&arnumber=735987> 6 Pages (56-61).*

Pekka Nikander et al., Distributed Policy Management for JDK 1.2, 1999, [Retrieved on Sep. 23, 2012]. Retrieved from the Internet: <URL:http://www.isoc.org/isoc/conferences/ndss/99/proceedings/papers/nikander.pdf> 11 Pages (1-11).*

Richard S. Hall, A Policy-Driven Class Loader to Support Deployment in Extensible Frameworks, 2004, [Retrieved on Sep. 23, 2012]. Retrieved from the internet: <URL:http://www.springerlink.com/content/6bwy0ct0wh3ve873/fulltext.pdf> 16 Pages (81-96).*

Roubtsov, "Find a way out of the ClassLoader maze", http://www.javaworld/javaqa/2003-06/01-qa-0606-load.html, Jun. 6, 2003.

Tuffs, "Simplify your application delivery with One-JAR", http://www-128.ibm.com/developerworks/java/library/j-onejar/ and http://one-jar.sourceforge.net/, Nov. 23, 2004.

The PathableClassLoader Class Loader http://jakarta.apache.org/commons/logging/xref-test/org/apache/commons/logging/PathableClassLoader.html Mar. 5, 2008 Date identified as per previous examiner request in crossed out references in "List of References cited by applicant and considered by examiner" dated Oct. 27, 2011.

WebSphere Class Loader Overview http://publib.boulder.ibm.com/infocenter/ieduasst/v1r1m0/topic/com.ibm.iea. was_v6/was/6.0/Runtime/WASv6_ClassLoader_Overview/player.html May 12, 2005 Date identified as per previous examiner request in crossed out references in "List of References cited by applicant and considered by examiner" dated Oct. 27, 2011.

* cited by examiner

```
class AppClass1 implements AppInterface {
    public void func1 ( ) {
        ExternalClass1 ec1 = new ExternalClass1();
        ...
        InternalClass1 ic1 = new InternalClass1();
        ...
        ExternalClass2 ec2 = ec1.getAttribute1();
        ...
        ExternalClass3 ec3 = ec1.getAttribute2() ;
        ec3.func3 ( ) ;
```

Fig. 1

```
protected Class loadClass(String name, boolean resolve)
   throws ClassNotFoundException {

Class c = findLoadedClass(name);

if(getDelegationPolicyForClass(name) == DELEGATION_POLICY_PARENT_LAST){
      // if not loaded, search it locally
      if (c == null) {
         try {
            c = findClass(name);
         }catch (ClassNotFoundException cnfe) {
            // ignore
         }
      } if (c == null) {
         if (getParentClassLoader() != null) {
            c = getParentClassLoader().loadClass(name);
         }else {
            c = getSystemClassLoader().loadClass(name);
         }
      }
   }
   else if(getDelegationPolicyForClass(name)==DELEGATION_POLICY_PARENT_FIRST){
      // Load the class using the usual parent-first delegation strategy
      ...
   }
   else {
      // should never happen
      ...
   }
   if (resolve) {
      resolveClass(c);
   }
   return c;
}
```

*Fig. 2*

```
// This is the class loader with a dynamic delegation policy described above
ClassLaoder cl = new DynamicClassLoader();

// Set the parent class loader to the application class loader
cl.setParentClassloader(this.getClass().getClassLoader());

// Specify that all the classes belonging to the package "com.ibm.myapp.service.*"
// will be loaded with a parent-first strategy.
cl.addDelegationPolicy("com.ibm.myapp.service.*", DELEGATION_PARENT_FIRST);

// Specify that all the classes belonging to the package "com.thirdparty.*"
// will be loaded with a parent-last strategy.
cl.addDelegationPolicy("com.thirdparty.*", DELEGATION_PARENT_LAST);

// All the classes whose name does not match any of the above patterns will
// automatically be loaded using a
// parent-first delegation policy. With these
// settings all the applications classes with the exception of the classes
// belonging to the "com.ibm.myapp.service"
// package are loaded through the
// main application class loader.
cl.setDefaultDelegationPolicy(DELEGATION_PARENT_FIRST);

// With the following setting we make this class loader able to see all the classes
// of the application as its parent class loader.
cl.addClasspath("myapp.jar");

// The following is the third party jar file containing the external classes used
// by the application.
cl.addClasspath("thirdparty.jar");

// Load and instantiate the class ServiceImpl1
com.ibm.myapp.IService s = Class.forName("com.ibm.myapp.service.ServiceImpl1",
                                          true,
                                          cl).newInstance();

// Call one of the methods provided by the object
s.func1();
```

*Fig. 4*

DYNAMIC CLASS LOADING

CROSS-REFERENCE TO RELATED APPLICATIONS

This application claims the benefit of foreign priority to European Patent Application No. 07119132.4, filed Oct. 23, 2007.

BACKGROUND

The present disclosure is directed to dynamic class loading, and more particularly to dynamic class loading during computer program execution.

In modern programming languages different methods exist to dynamically load interdependent components of an executable code for an application. An example of a programming language is the Java™ programming language, which is an object oriented programming language. In the Java™ programming language the interdependent component refers to a class. An object or an instance may be created or instantiated from a class. In Java™, when the program requests a specific object, a class loader dynamically loads a class in order to instantiate the requested object from the class. The class loader may load files relating to both the class and the way of implementing the class in the application. These files are called .jar files. A class generally refers to one or more referenced classes. When a referenced class is to be loaded, a specific Java™ dedicated delegation policy, called parent first, may apply to the class loader. Indeed, the class loader used to load any referenced class of a given class is the same used to load the parent class itself. In addition, the parent first delegation policy means that when a class loader is requested to load a given class the class loader first delegates to its parent class loader the loading of the class. If there is a failure in the loading of the class by the parent class loader, then the class loader of the parent class will try to load the referenced class itself.

A referenced class may correspond to a class which belongs to a third party library, which means that the corresponding .jar files are external files unknown by the class loader of the application. Thus, when executing the loading of a referenced class belonging to a third party library, the class loader refers to the parent class of the referenced class before loading the referenced class. However, as the class loader relates to the application, the class loader does not know how to access the .jar file relating to the referenced class belonging to a third party library.

SUMMARY

According to one embodiment of the present invention a method is disclosed. The method includes requesting a class to be dynamically loaded during program execution. The class includes an attribute. A properties file is searched for the attribute. An associated delegation policy is found in the properties file. The associated delegation policy is associated with the attribute. The class is loaded by applying the associated delegation policy.

DRAWING DESCRIPTION

Reference will now be made, by way of example, to the accompanying drawings.

FIG. 1 shows a definition of a class which belongs to the application and which refers to some other classes, belonging either to the application itself or to a third party library, in accordance with one embodiment of the invention, given by way of example.

FIG. 2 shows an algorithm followed by the class loader in accordance with one embodiment of the invention, given by way of example.

FIG. 4 shows another algorithm followed by the class loader in accordance with one embodiment of the invention, given by way of example.

DETAILED DESCRIPTION

Figure 3:
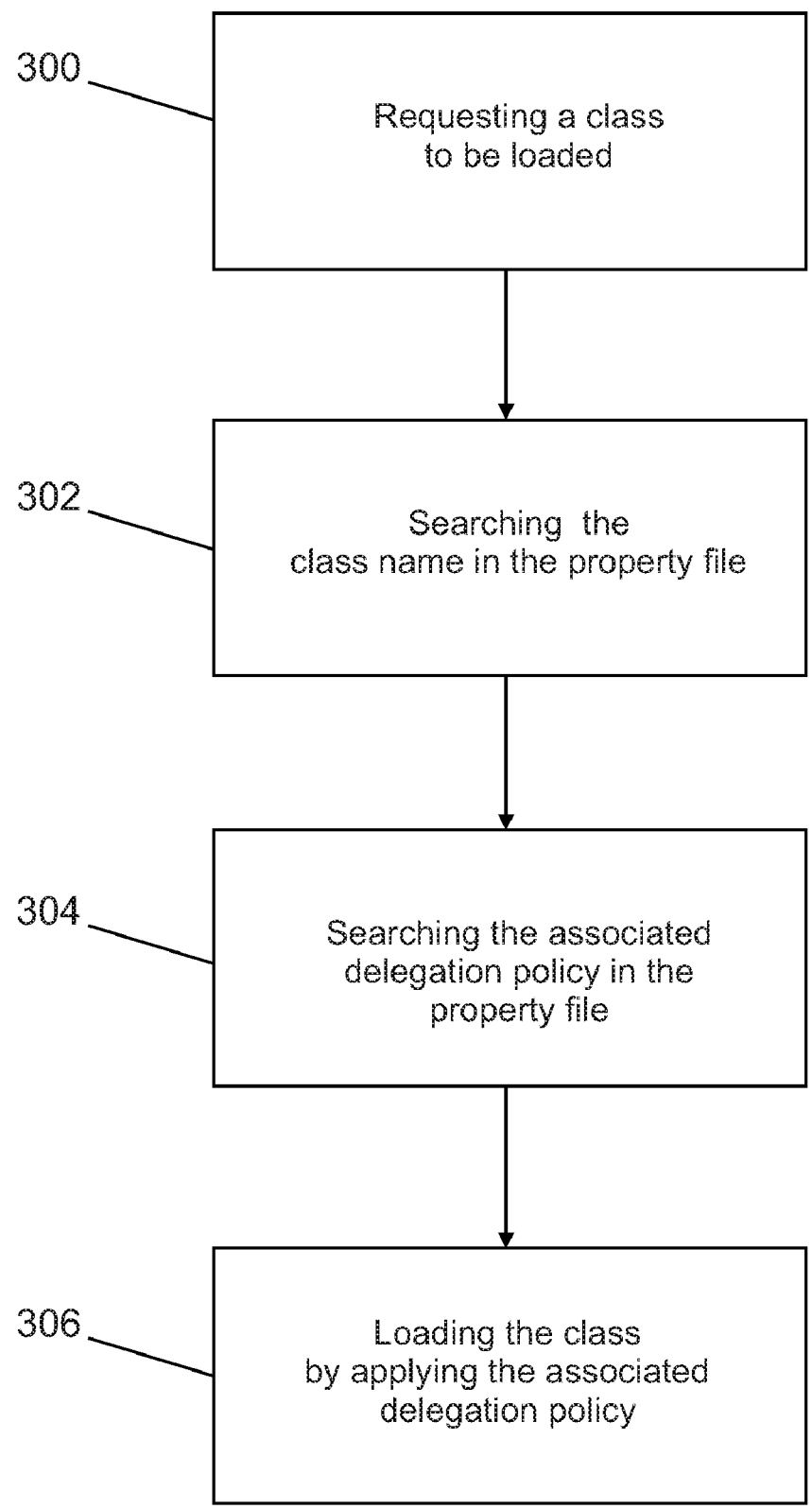
FIG. 3 shows a flowchart of the method in accordance with one embodiment of the invention, given by way of example.

A Java™ application executes a program, which uses internal and external classes. Each class includes data and functions. Functions are associated with the method to process the data. Thus, the Java™ application uses two types of files referring to internal and external classes. The first type of file contains internal classes and it is an internal file of the application called an internal jar file. As shown in FIG. 1, the internal jar file comprises internal classes having the form of InternalClass<x> and belongs to the application. The second type of file contains external classes and it is an external file of the application called an external jar file. The external jar file comprises external classes having the form of ExternalClass<x> and belongs to an external library. The internal jar file includes files relating to classes and files relating to resources associated to the application. Internal classes reference external classes which means that the internal classes are identified as being parent of the external classes. A specific class path refers to each jar file. Thus, an internal class path refers to the internal jar file and an external class path refers to the external jar file. For each internal class an internal class loader runs when the program requests an internal class. The class loader allows a specific class requested when executing a program of the application to be loaded. The internal class loader uses the common delegation policy of Java™. Thus, before loading a requested class, the class loader of the child class may check its parent class loader. Thus, if the parent class loader is not able to load the class, then the child class loader will try to load the class.

When the program requests a class referenced by an internal class, a specific customized class loader may be instantiated in order to load that class. The instantiated class loader has a dynamic delegation policy.

Thus, depending on an attribute of the requested class a class loader is instantiated with a specific delegation policy. In the current embodiment, the attribute is a class name. The delegation policy is defined in a properties file. The properties file defines, for each class, a specific delegation policy referring either to a parent first delegation policy or parent last delegation policy. Thus, when the program requests a class, the properties file defines the matching between the requested class and the associated delegation policy as will be described below.

When the application needs to use resources or classes belonging to external libraries and when classes of the application, i.e. internal classes, reference such external libraries, a specific and customized class loader may be instantiated as shown in FIG. 3. Thus, when the program requests a class as indicated in step 300, the algorithm described in FIG. 2 is launched to create the customized class loader. In a step 300, the program requests an external class to be loaded. The class loader of the application has a dynamic delegation policy. Thus, as shown in step 302, before loading the requested class by applying the common parent first delegation policy of Java™, the class loader first searches for the requested class in the properties file as defined above. Then, in a step 304, the class loader may find in the properties file the associated delegation policy which matches the requested class. The properties file may specify a delegation policy of a group or class. For instance, a specific kind of class such as all the classes belonging to the package "com.ibm.xyz" may be defined as having a parent last delegation policy and all the other classes have a parent first delegation policy. In a step 306, the class loader loads the requested class by applying the associated delegation policy found in the properties file.

It may occur that the application needs to use the services implemented by an external library. This may imply that the services are accessed through a common interface defined inside the application (i.e. com.ibm.myapp.IService) and implemented in an application class called com.ibm.myapp.service.ServiceImpl1. Thus, when the application requests the services, the class com.ibm.myapp.service.ServiceImpl1 may be instantiated as described in FIG. 4.

With the system described, all the classes of the application may be archived into a single jar file without losing the capability to determine at runtime which version of the external libraries to load. In this way, we are able to improve the isolation between the core application code and the external services allowing the application to load its version of the external library without affecting other components of the application itself and without the need to split the application code into several separate jar files.

It will be appreciated that the examples described above relate to the loading of classes. Other alternatives may exist relating to any kind of resources that are loaded through a class loader, which fall within the scope of the present disclosure.

Embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. A method comprising:
   requesting a class to be dynamically loaded during program execution, wherein the class includes an attribute;
   determining the attribute;
   searching a properties file for the attribute;
   finding an associated delegation policy in the properties file in response to said determining of the attribute, wherein the associated delegation policy is associated with the attribute; and
   loading the class by applying the associated delegation policy.

2. The method of claim 1, wherein the associated delegation policy is selected from among a plurality of delegation policies comprising at least a parent first delegation policy and a parent last delegation policy; and
   wherein the class is included in an external library.

3. The method of claim 1, wherein the attribute includes a class name

4. The method of claim 1, wherein the class includes an external class.

5. The method of claim 1, wherein the class includes multiple classes belonging to a package.

6. The method of claim 1, wherein the properties file further includes additional attributes associated with additional delegation policies.

7. A computer program product comprising:
   a computer readable storage medium including computer usable program code embodied therewith, wherein the computer usable program code is executable by a processor to:
   request a class to be dynamically loaded during program execution, wherein the class includes an attribute;
   determine the attribute;
   search a properties file for the attribute;
   find an associated delegation policy in the properties file in response to said determining of the attribute, wherein the associated delegation policy is associated with the attribute; and
   load the class by applying the associated delegation policy.

8. The computer program product of claim 7, wherein the associated delegation policy is selected from among a plurality of delegation policies comprising at least a parent first delegation policy and a parent last delegation policy; and
   wherein the class is included in an external library.

9. The computer program product of claim 7, wherein the attribute includes a class name.

10. The computer program product of claim 7, wherein the class includes an external class.

11. The computer program product of claim 7, wherein the class includes multiple classes belonging to a package.

12. The computer program product of claim 7, wherein the properties file further includes additional attributes associated with additional delegation policies.

13. The computer program product of claim 7, wherein the computer usable program code is further executable by the processor to:
   access the properties file.

14. A system for loading a class file comprising:
   a processor;
   a non-transitor computer readable storage medium coupled to the processor on which is stored a class loader application including instructions for execution by the processor; and
   a network adapter coupled to the system and in communication with a remote storage medium on which is stored a class and a properties file with an attribute associated with the class;
   wherein the system is configured with a delegation policy associated with the attribute, and the class loader is configured to use the delegation policy to load the class.

15. The system of claim 14, wherein said class stored on the remote storage medium is one of a plurality of classes which includes:
   a first class having a parent first delegation policy; and
   a second class having a parent last delegation policy.

16. The system of claim 14, configured to supply the properties file to the class loader.

17. The system of claim 14, wherein the attribute includes a class name.

18. The system of claim 14, wherein the class includes multiple classes belonging to a package.

19. The system of claim 14, wherein the properties file further includes additional attributes associated with additional delegation policies.

* * * * *